No. 719,847. PATENTED FEB. 3, 1903.
W. NOBLE.
NUT LOCK.
APPLICATION FILED JULY 23, 1902.
NO MODEL.

WITNESSES:
Paul Hunter
Wm T. Patton

INVENTOR
Willie Noble
BY
ATTORNEYS.

UNITED STATES PATENT OFFICE.

WILLIE NOBLE, OF WEST UNION, WEST VIRGINIA.

NUT-LOCK.

SPECIFICATION forming part of Letters Patent No. 719,847, dated February 3, 1903.

Application filed July 23, 1902. Serial No. 116,652. (No model.)

*To all whom it may concern:*

Be it known that I, WILLIE NOBLE, a citizen of the United States, and a resident of West Union, in the county of Doddridge and State of West Virginia, have invented a new and Improved Nut-Lock, of which the following is a full, clear, and exact description.

The object of my invention is to provide a nut-lock having novel details of construction which are simple and practical and adapt the improvement for general application to screw-bolts without alteration of said bolts and also for application upon square or hexagonal nuts with but slight change, that will not materially increase their cost of production, the nuts being held at any desired point on the bolt-thread against accidental displacement, but being capable of removal by a suitable wrench.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1:
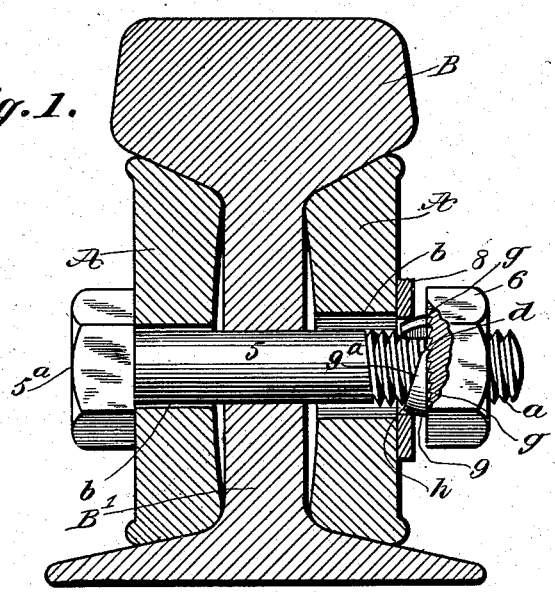
Figures 2, 3:
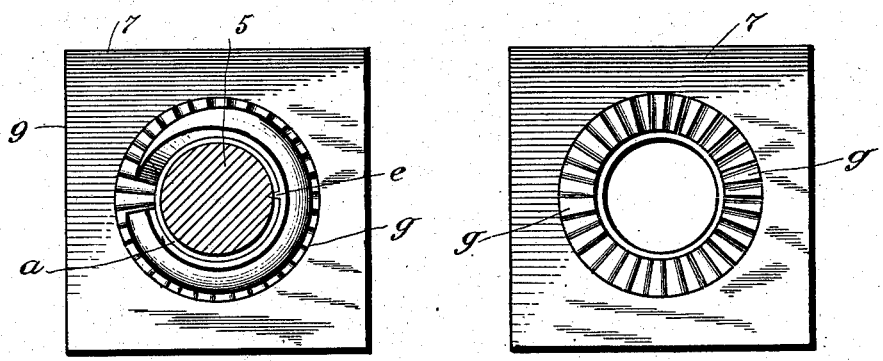
Figure 4:
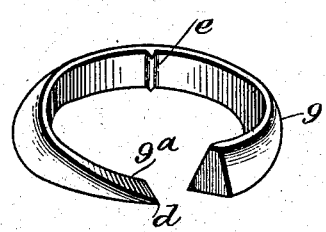

Figure 1 is a partly-sectional side view of a nut and a side view of the improved nut-lock engaged with a toothed surface on the nut. Fig. 2 is an enlarged end view of a nut, a transverse sectional view of a bolt-body whereon the nut is screwed, and a plan view of the improved nut-lock engaging the nut and bolt thread. Fig. 3 is an end view of a nut having its end wall serrated to engage with the improved nut-lock, and Fig. 4 is a perspective view of the improved nut-lock.

This invention provides means for the retention of nuts on screw-bolts of various dimensions and permits their removal as occasion may require, one use for the improvement shown to illustrate its application consisting in the employment of the improved nut-lock for securing the nuts of screw-bolts that hold in place fish-plates at the joints between the ends of railroad-track rails, as represented in Fig. 1.

The bolt 5 may have a hexagonal head $5^a$ on one end, and the nut 6 may be hexagonal, as shown in Fig. 1, or be square, as represented by the designating character 7 in Figs. 2 and 3, said nut being screwed upon the thread $a$ of the bolt when the latter is adjusted within alined perforations $b$ in the fish-plates A and web B' of the track-rail B.

A washer 8 of ordinary form is usually provided to coact with the nut-lock and is placed upon the projecting portion of the threaded body of the bolt 5 when the latter is applied for service.

The nut-lock proper consists of a ring-shaped dog 9, clearly shown in Fig. 4, said dog being formed of a steel bar essentially triangular in cross-section and bent circularly so as to produce an open ring of suitable diameter. One end of the open ring is cut at or near a right angle to the lower flat surface of the dog 9, while the portion of the material at and near the opposite end thereof is sloped on the upper side, as at $9^a$, so as to provide a locking-toe $d$ at the extremity of this sloped end, said toe having a slightly-downward inclination, as is shown Figs. 1 and 4. To facilitate the insertion of the sloped end $9^a$, it is reduced somewhat in width toward the toe $d$, thus avoiding friction on the washer 8.

Upon the inner surface of the circular dog 9 a V-shaped tooth $e$ is formed, preferably opposite the toe $d$, and when the circular nut-lock body 9 is mounted upon the threaded portion $a$ of the bolt 5 the tooth $e$ will loosely contact with the thread $a$.

Upon one side of the nut 6 or 7, that is disposed adjacent to the nut-lock or dog 9, a series of tooth-like indents $g$ are formed and are arranged circularly, radiating from the threaded hole in the nut.

When the improvement is applied for the retention of the nut 6 or 7 upon the threaded body of the bolt 5, the circular dog or nut-lock 9 is mounted upon the projecting end of the bolt and the smaller end of its coniform body is introduced into an annular channel $h$, that intervenes the edge of the washer-opening and the thread $a$ of the bolt. The nut 6 may now be screwed upon the threaded projecting end of the bolt 5, so as to contact with the flat bottom surface of the nut-lock body, a continuation of this operation drawing the fish-plates A tightly against the rail-web B'. The frictional resistance between the bolt-head $5^a$ and the fish-plate A, with which it contacts, facilitates the enforced pressure of the nut 6 upon the nut-lock or dog 9. The turning of the nut 6, so as to screw it upon the bolt-body, serves to contract the diameter of the circular nut-lock or dog 9, which will press the tooth e against the thread a and prevent the nut-lock or dog from turning on the bolt, this contraction of the nut-lock permitting the nut to bear upon the washer 8, and thus render the connection reliable.

It will be seen that the rotatable adjustment of the nut 6, so as to complete the clamping of the fish-plates upon the webs of track-rails, will adapt the toe d to enter an appropriate indent g in the nut, and thus reliably hold the nut from reverse rotation. As the indents g are shallow, it is evident that by the use of a suitable wrench the nut 6 or 7 may be unscrewed from the bolt and replaced an indefinite number of times.

It will be apparent from the foregoing description that the improvement may be applied to bolts and nuts of various sizes, that the bolts need not be changed in any respect, that the indents in the ends of the nuts may be formed while the nuts are pressed into form, so that this will not add to the cost, and, furthermore, that the nut-lock proper is extremely simple, may be formed rapidly by simple machinery, and may be produced at a very low cost.

The improvement has been described as applied to railroad-track construction; but obviously the device is available for use on bolts and nuts in any construction where a nut-lock would be advantageous.

Having thus described my invention, I claim as new and desire to secure by Letters Patent—

1. A nut-lock, comprising an open metal ring, essentially triangular in cross-section, sloped on the thin edge at and near one end to form a thin extremity, a locking-toe bent down at said extremity, and a tooth formed on the inner side of the ring opposite the opening therein.

2. The combination with a screw-bolt and a nut thereon, said nut having a series of indents at one end, of a nut-lock formed as an open ring, sloped at one end to sharpen it, said end being bent down to form a locking-toe to engage the indents on the nut, and a tooth projecting inward from the inner surface of the open ring opposite its opening, to contact with the thread of the bolt when the nut-lock is applied for holding the nut from unscrewing.

In testimony whereof I have signed my name to this specification in the presence of two subscribing witnesses.

WILLIE NOBLE.

Witnesses:
WILLIAM M. KNIGHT,
ARTHUR INGLE.